(12) United States Patent
Sergeant et al.

(10) Patent No.: US 10,584,267 B2
(45) Date of Patent: Mar. 10, 2020

(54) LOW APPLICATION TEMPERATURE HOT MELT ADHESIVE COMPOSITION AND A METHOD INCLUDING THE SAME

(71) Applicant: H.B. Fuller Company, St. Paul, MN (US)

(72) Inventors: Richard B. Sergeant, Blois (FR); Thomas F. Kauffman, Woodbury, MN (US)

(73) Assignee: H.B.Fuller Company, St. Paul, MN (US)

( * ) Notice: Subject to any disclaimer, the term of this patent is extended or adjusted under 35 U.S.C. 154(b) by 0 days.

(21) Appl. No.: 15/816,789

(22) Filed: Nov. 17, 2017

(65) Prior Publication Data

US 2018/0134927 A1 May 17, 2018

Related U.S. Application Data

(60) Provisional application No. 62/423,462, filed on Nov. 17, 2016.

(51) Int. Cl.
| | |
|---|---|
| *C09J 123/08* | (2006.01) |
| *C09J 7/35* | (2018.01) |
| *B29C 65/48* | (2006.01) |
| *C09J 5/06* | (2006.01) |
| *C09J 193/04* | (2006.01) |
| *C09J 11/06* | (2006.01) |
| *C09J 11/08* | (2006.01) |

(52) U.S. Cl.
CPC ..... *C09J 123/0815* (2013.01); *B29C 65/4815* (2013.01); *C09J 5/06* (2013.01); *C09J 7/35* (2018.01); *C09J 123/08* (2013.01); *C09J 193/04* (2013.01); *C09J 11/06* (2013.01); *C09J 11/08* (2013.01); *C09J 2205/114* (2013.01); *C09J 2401/006* (2013.01); *C09J 2423/04* (2013.01); *C09J 2423/16* (2013.01); *C09J 2493/00* (2013.01)

(58) Field of Classification Search
CPC .......... C08L 23/02; C08L 23/04; C08L 23/08; C08L 23/0815; C09J 7/24; C09J 7/30; C09J 11/08; C09J 123/02; C09J 123/04; C09J 123/06; C09J 123/08; C09J 123/0815
See application file for complete search history.

(56) References Cited

U.S. PATENT DOCUMENTS

| | | | |
|---|---|---|---|
| 6,117,945 A | 9/2000 | Mehaffy et al. | |
| 6,319,979 B1 | 11/2001 | Dubois et al. | |
| 8,702,900 B2 | 4/2014 | Hu et al. | |
| 8,877,305 B2 | 11/2014 | Patel et al. | |
| 9,303,195 B2 | 4/2016 | Neumann et al. | |
| 2009/0120577 A1 | 5/2009 | Eichler-Johnson et al. | |
| 2015/0114583 A1 | 4/2015 | Takamori | |
| 2016/0215176 A1* | 7/2016 | Kanderski | C09J 123/0815 |

FOREIGN PATENT DOCUMENTS

EP    2 115 087    4/2013

* cited by examiner

*Primary Examiner* — Irina S Zemel
*Assistant Examiner* — Jeffrey S Lenihan
(74) *Attorney, Agent, or Firm* — Kirsten Stone; Daniel Barta

(57) ABSTRACT

The invention features a hot melt adhesive composition that can be applied at temperatures as low as 107° C., while maintaining excellent bonding under stress and a very fast setting time.

16 Claims, No Drawings

LOW APPLICATION TEMPERATURE HOT MELT ADHESIVE COMPOSITION AND A METHOD INCLUDING THE SAME

This application claims priority to and benefit of provisional filed patent application Ser. No. 62/423,462 filed Nov. 17, 2016 and incorporated herein.

BACKGROUND

The invention relates to a low application temperature hot melt adhesive composition particularly useful in packaging applications for forming and/or closing cellulose-based cases and cartons.

Hot melt adhesive compositions for packaging applications are often applied at relatively high temperatures (e.g. 177° C.). The high temperature is necessary to melt the composition and to decrease the viscosity of the composition to a point where it can be applied, can wet out on a substrate, and can form a bond to the substrate.

These high temperatures can generate irritating fumes, increase the risk that contacting the composition in its molten state will cause burns, and induce degradation of the composition.

It would be desirable to achieve a low application temperature hot melt adhesive composition which could be applied at temperatures as tow as 107° C. while maintaining excellent bonding under stress and a very fast setting time. It would further be desirable if this performance could be obtained without the use of maleic anhydride modified components which can be expensive.

SUMMARY

In one aspect, the invention features a hot melt adhesive composition including a homogeneous linear or substantially linear ethylene interpolymer having a Brookfield viscosity of no greater than about 10,000 cps at 177° C., from about 10% by weight to about 30% by weight of a rosin based tackifying agent, from about 10% by weight to about 40% by weight of a hydrocarbon tackifying agent, a paraffin wax, and a Fischer Tropsch wax, wherein the hot melt adhesive composition has a Brookfield viscosity of no greater than about 1400 cps at 120° C.

In one embodiment, the hot melt adhesive composition has a Brookfield viscosity of no greater than about 1000 cps at 120° C. In a different embodiment, the Fischer-Tropsch wax has a congealing point of from about 65° C. to about 95° C.

In another embodiment, the rosin based tackifying agent and the hydrocarbon tackifying agent both have a softening point of from about 75° C. to about 110° C. In still another embodiment, the rosin based tackifying agent and the hydrocarbon tackifying agent both have a softening point of from about 95° C. to about 105° C.

In one embodiment, the hot melt adhesive composition includes from about 15% by weight to about 30% by weight of a rosin based tackifying agent and from about 15% by weight to about 30% by weight of a hydrocarbon tackifying agent. In a different embodiment, the hot melt adhesive composition is free of maleic anhydride modified components.

In a different embodiment, the homogeneous linear or substantially linear ethylene interpolymer is selected from the group consisting of ethylene octene, ethylene hexene, ethylene butene, and ethylene propylene. In another embodiment, the homogeneous linear or substantially linear ethylene interpolymer is made with a single site catalyst. In one embodiment, the hot melt adhesive composition further comprises a vinyl polymer. In another embodiment, it further comprises an aromatic tackifying agent.

In one aspect, the invention features method of making or closing an article, the method comprising heating the inventive hot melt adhesive composition; and applying the hot melt adhesive composition on a substrate at an application temperature of no greater than 121° C. In one embodiment, the hot melt adhesive composition is applied at a temperature of no greater than 115° C. In still another embodiment, the hot melt adhesive composition is applied at a temperature of no greater than 110° C.

In one embodiment, the article is a case or carton. In another embodiment, the article comprises a cellulose based substrate.

The invention features a hot melt adhesive composition that can be applied at temperatures as low as 107° C., while maintaining excellent bonding under stress and a very fast setting time.

Other features and advantages will be apparent from the following description of the preferred embodiments and from the claims.

DETAILED DESCRIPTION

Melt Adhesive Composition

The hot melt adhesive composition includes a homogeneous linear or substantially linear ethylene interpolymer having a Brookfield viscosity of no greater than about 10,000 cps at 177° C., from about 10% by weight to about 30% by weight of a rosin based tackifying agent, from about 10% by weight to about 40% by weight of a hydrocarbon tackifying agent, a paraffin wax, and a Fischer Tropsch wax.

In one embodiment, the homogeneous linear or substantially linear ethylene interpolymer having a Brookfield viscosity of no greater than about 10,000 cps at 177° C., the rosin based tackifying agent, the hydrocarbon tackifying agent, the paraffin wax and the Fischer Tropsch wax make up at least 85% by weight, at least 90% by weight, or even at least 95% by weight of the hot melt adhesive composition.

The hot melt adhesive composition can be applied at very low application temperatures. One measure of the ability of a hot melt adhesive composition to be applied at a low application temperature is its melt viscosity. The hot melt adhesive composition preferably exhibits a viscosity of no greater than about 1400 cps at 121° C., or even no greater than about 1200 cps at 121° C. In other embodiments, the composition exhibits a viscosity of no greater than about 1000 cps at 121° C., no greater than about 900 cps at 121° C., no greater than about 800 cps at 121° C., or even between about 50 cps and 1400 cps at 121° C. In other embodiments, the composition exhibits a viscosity of no greater than about 2500 cps, no greater than about 2000 cps, no greater than about 1500 cps at 100° C., or even between about 50 cps and about 1500 cps at 100° C.

The hot melt adhesive composition exhibits good resistance to heat and cold. One useful measure of this resistance is the ability to maintain a bond at a wide range of temperatures. The hot melt adhesive composition preferably exhibits a fiber-tearing bond at temperatures ranging from −18° C. to 45° C. A fiber-tearing bond is one in which fibers cover at least a portion of the area of the adhesive composition after two substrates that have been previously bonded together through the adhesive composition are separated by force.

The hot melt adhesive composition can be free of maleic anhydride modified components.

The hot melt adhesive has improved hot tack compared to other low application temperature hot melt adhesives.

Tackifying Agent

The hot melt adhesive composition includes a rosin based tackifying agent and a hydrocarbon tackifying agent.

The total amount of tackifying agent in the composition can range from about 20% by weight to about 60% by weight, from about 30% by weight to about 60% by weight, or even from about 45% by weight to about 55% by weight.

The rosin based tackifying agent includes unmodified and modified rosins such as gum rosin, wood rosin, tall oil rosin, distilled rosin, hydrogenated rosin, dimerized rosin and polymerized rosin; rosin esters such as glycerol and pentaerythritol esters of natural and modified rosins including, glycerol esters of pale, wood rosin, glycerol esters of hydrogenated rosin, glycerol esters of polymerized rosin, and pentaerythritol esters of hydrogenated rosin.

The rosin based tackifying agent can have a softening point of from about 75° C. to about 110° C., or even from about 95° C. to about 105° C. The rosin based tackifying agent can be hydrogenated.

Examples of useful commercially available rosin based tackifying agents include resins available under the trade designations SYLVALITE RE 100L pentaerythritol ester of rosin, SYLVATACK RE 98 pentaerythritol ester of tall oil rosin and UNI-TAC 70 modified rosin, all available from Arizona Chemical (Jacksonville, Fla.), WESTREZ 5101 pentaerythritol ester of rosin and DERTOLINE PLS pentaerythritol ester of tall oil rosin, both available from DRT (Cedex, France) and FORAL AX AND FORAL NC, both hydrogenated rosins available from Pinova, Inc. (Brunswick, Ga.

The rosin based tackifying agent is present in the compositions at from about 10% by weight to about 30% by weight, from about 15% by weight to about 25% by weight, or even from about 20% by weight to about 30% by weight.

The hydrocarbon tackifying agent can be a aliphatic or cycloaliphatic petroleum hydrocarbon resin including those having a softening point of from about 80° C. to about 130° C., from about 90° C. to about 120° C., or even from about 95° C. to about 105° C. Suitable aliphatic and cycloaliphatic petroleum hydrocarbon resins include, e.g., branched, unbranched, and cyclic C5 resins, C9 resins, and C10 resins. The hydrocarbon tackifying agent can have aromatic modification. The hydrocarbon tackifying agent is preferably either fully or partially hydrogenated.

Useful hydrocarbon tackifying agents are commercially available under a variety of trade designations including, e.g. hydrocarbon resins under the ESCOREZ series of trade designations from ExxonMobil Chemical Company (Houston, Tex.) including, e.g. ESCOREZ 1315, ESCOREZ 5380, ESCOREZ 5400, ESCOREZ 5415, ESCOREZ 5690, ESCOREZ 5600 and ESCOREZ 5615, hydrocarbon resins under the WINGTACK series of trade designations from Cray Valley HSC (Exton, Pa.) including, e.g. WINGTACK EXTRA and WINGTACK 95 and aliphatic hydrocarbon resin PICCOTAC 1115 available from Eastman Chemical Company (Kingsport, Tenn.).

The hydrocarbon tackifying agent is present in the compositions at from about 10% by weight to about 40% by weight, from about 15% by weight to about 35% by weight, or even from about 20% by weight to about 30% by weight.

In addition to the rosin based tackifying agent and the hydrocarbon tackifying agent, the composition can further include an aromatic tackifying agent. Useful aromatic tackifying agents can be prepared or derived from any monomer containing an aromatic moiety and a polymerizable ethylenically unsaturated group. Typical examples of aromatic monomers can include styrenic monomers such as styrene, alpha-methylstyrene, vinyl toluene, methoxystyrene, tertiary butyl styrene, chlorostyrene, etc.; indene monomers such as indene, methyl indene, coumarone indene and others; and mixtures thereof.

Useful aromatic tackifying agents include KRISTALEX 3100, available from Eastman Chemical Company (Kingsport, Tenn.).

When used, the aromatic tackifying agent is present at no greater than about 10% by weight, or even from about 5% by weight to about 10% by weight.

Homogeneous Linear or Substantially Linear Ethylene Interpolymer

The hot melt adhesive composition includes a homogeneous linear or substantially linear ethylene interpolymer with a Brookfield viscosity of no greater than about 10,000 cps at 177° C.

The homogeneous linear or substantially linear ethylene interpolymer is derived from at least 50% by weight ethylene and at least one alpha-olefin monomer having at least 3 carbons, or even from 3 to 20 carbon atoms. Useful alpha-olefin monomers include e.g. propylene, isobutylene, butene, pentene, hexene, heptene, octene, nonene, decene, dodecene, 4-methyl-1-pentene, 3-methyl-1-pentene, 3-methyl pentene-1,1,3,5,5-trimethyl-hexene-1,5-ethyl-1-nonene, and combinations thereof. Specific examples of suitable homogeneous linear or substantially linear ethylene interpolymers includes ethylene-propylene, ethylene-hexene, ethylene-octene, and combinations thereof.

Useful homogeneous linear or substantially linear ethylene interpolymers can be prepared using a variety of catalysts including, e.g. a single site catalyst (e.g. metallocene catalysts), multiple single site catalysts, non-metallocene heteroaryl catalysts, and combinations thereof.

Useful commercially available homogeneous linear or substantially linear ethylene interpolymers with a Brookfield viscosity of no greater than 10,000 cps at 177° C. includes AFFINITY GA 1900, AFFINITY GA 1900 H and AFFINITY GA 1875 all available from Dow Chemical Company (Midland, Mich.).

The hot melt adhesive composition includes from about 10% by weight to about 50% by weight, from about 15% by weight to about 40% by weight, or even from about 20% by weight to about 30% by weight of the homogeneous linear or substantially linear ethylene interpolymer.

Wax.

The hot melt adhesive composition includes a paraffin wax. Paraffin waxes are refined from crude oil. In one embodiment, useful paraffin waxes contain from about 40% to about 90% of normal alkanes and contain less than about 3.0% by weight oil, or even less than about 2.0% by weight oil. Useful paraffin waxes have a congealing point of greater than about 60° C., greater than about 62° C., or even from about 60° C. to about 75° C.

Useful commercially available paraffin waxes include e.g., FR-6513 from Citgo Petroleum (Houston, Tex.) and SASOLWAX 6705 from Sasol Performance Chemicals (Hamburg, Germany).

The paraffin wax is preferably present in the hot melt adhesive composition in an amount from about 5% by weight to about 40% by weight, from about 10% by weight to about 35% by weight, or even from about 10% by weight to about 20% by weight.

The hot melt adhesive further includes a Fischer-Tropsch wax. The blend of paraffin and Fischer-Tropsch wax helps to give the product a low viscosity at application temperature and a fast rate of set.

Fischer-Tropsch waxes are produced by Fischer-Tropsch synthesis including e.g., a catalyzed chemical reaction in which synthesis gas (i.e. syngas), a mixture of carbon monoxide and hydrogen, is converted into liquid hydrocarbons of various lengths. Useful Fischer-Tropsch waxes have a congealing point of no greater than about 95° C., no greater than about 90° C., or even between about 65° C. and 95° C.

Useful commercially available Fischer-Tropsch waxes include SARAWAX SX-70 and SX-80, Fischer-Tropsch waxes from Shell MDS (Bintulu, Malaysia) and SASOL-WAX C-80, Fischer-Tropsch wax from Sasol Performance Chemicals (Hamburg, Germany).

The Fischer-Tropsch wax is present in the composition in an amount from about 2% by weight to about 25% by weight, from about 5% by weight to about 15% by weight, or even from about 5% by weight to about 12% by weight.

Additional Components

The hot melt adhesive composition can additionally include a vinyl polymer. The vinyl polymer can be derived from ethylene and a co-monomer that includes vinyl unsaturation examples of which include vinyl acetate, alkyl acrylate, alkyl methacrylate, and combinations thereof. Useful ethylene copolymers include, ethylene vinyl acetate, ethylene acrylate, ethylene methacrylate, ethylene methyl methacrylate, ethylene n-butylacrylate, ethylene 2-ethyl hexyl acrylate, ethylene octyl acrylate and combinations thereof.

Useful commercially available vinyl polymers can include ENBA EN 33900 (33-900), ethylene n-butyl acrylate copolymer available from ExxonMobil Chemical Company (Houston, Tex.) and ALCUDIA PA-407 (14→1500) ethylene vinyl acetate copolymer available from Repsol (Madrid, Spain).

The vinyl polymer has a melt index of at least about 450 g/10 min, at least about 500 g/10 min, at least about 1000 g/10 min, at least about 1200 g/10 min, at least about 1500 g/10 min, at least about 2000 g/10 min, from about 450 g/10 min to about 3000 g/10 min, or even from about 500 g/10 min to about 2500 g/10 min at 190° C. when tested according to ASTM D 1238-04C using a 2.16 kg weight.

The hot melt adhesive composition optionally includes a variety of additional components including, e.g., antioxidants, stabilizers, additional tackifying agents, additional polymers (e.g. propylene based polymers, higher viscosity homogeneous linear or substantially linear ethylene interpolymers, other olefin based polymers, and styrene block copolymers), additional waxes (e.g. microcrystalline wax), adhesion promoters, ultraviolet light stabilizers, rheology modifiers, corrosion inhibitors, colorants (e.g., pigments and dyes), fillers, flame retardants, nucleating agents, and combinations thereof.

Useful antioxidants include, e.g., pentaerythritol tetrakis [3,(3,5-di-tert-butyl-4-hydroxyphenyl)propionate], 2,2'-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, N.J.), and ETHYL 702 4,4'-methylene bis(2,6-di-tert-butylphenol) (Albemarle Corporation, Baton Rouge, La.). When present, the adhesive composition preferably includes from about 0.1% by weight to about 2% by weight, or even from 0.1 to 0.5% by weight antioxidant.

Uses

The adhesive composition is well suited for use in packaging applications including, e.g., forming seals, seams and destructive bonds between two or more substrates. The adhesive composition is further well suited to straw attachment. In straw attachment, a drinking straw is attached to the outside of a beverage container. The hot melt adhesive composition can be applied to a variety of substrates and is particularly useful in bonding a first substrate to a second substrate through the hot melt adhesive composition. Suitable substrates include virgin and recycled cellulose-based substrates including, e.g., paper, Kraft paper, cover stock, paperboard, corrugated paperboard, cardboard, corrugated cardboard, chipboard, and solid fiber paper board, as well as the aforementioned substrates with treated surfaces including, e.g., coatings (e.g., coated Kraft paper, coated Kraft paperboard, and coated cardboard) and combinations thereof.

Coatings often used to treat cellulose-based substrates include, e.g., wax (e.g., paraffin wax), lipids, zein (i.e., alcohol soluble protein derived from corn), clay, polymer, and combinations thereof.

The hot melt composition is particularly suitable for the formation of packaging constructions including, e.g., bags, boxes (e.g., beverage (e.g., beer, soda, etc), and cereal boxes), cartons, cases (e.g. carrying cases), trays, and combinations thereof, and sealing applications including, e.g., case and carton sealing.

The hot melt adhesive composition preferably forms a fiber-tearing bond to at least one of the substrates of the packaging construction.

The hot melt adhesive composition can be applied to a substrate using a variety of hot melt application techniques including, e.g., extrusion (e.g., bead applicator), roll coating, and slot nozzle coating. In one application method, the hot melt adhesive composition is extruded through a nozzle onto a substrate and then contacted with a second substrate. As the composition cools, the first substrate forms a bond to the second substrate through the hot melt adhesive composition.

The hot melt adhesive composition can be applied in a variety of forms including, e.g., a bead, continuous, discontinuous (e.g., intermittently (e.g., dots and dashes)), pattern, randomly, and combinations thereof.

The low viscosity of the inventive hot melt adhesive compositions gives the user the ability to apply the hot melt adhesive at very low application temperatures.

The invention includes a method of making or closing an article, the method including, heating the inventive hot melt adhesive composition and applying the hot melt adhesive composition to a substrate at an application temperature of no greater than 130° C., no greater than 121° C., no greater than 115° C., no greater than 110° C., between about 100° C. and 130° C., or even between about 100° C. and 115° C.

The invention will now be described by way of the following examples. All ratios and percentages are by weight unless otherwise indicated.

EXAMPLES

Test Procedures

Test procedures used in the examples include the following.

Viscosity Test Method

Viscosity is determined in accordance with ASTM D-3236 entitled, "Standard Test Method for Apparent Viscosity of Hot Melt Adhesives and Coating Materials," (Oct. 31, 1988). Melt viscosities are determined on a Brookfield Thermosel Viscometer Model LVDV 2+ using an appropriate spindle, and reported in centipoise ("cps").

Peel Adhesion Failure Temperature ("PAFT") Test Method

The peel adhesion failure temperature ("PAFT") is the temperature in degrees Celsius at which the bond of the sample fails. PAFT is measured in accordance with the PAFT test in ASTM D-4498 with the exception that the thickness of the test piece sandwich is a hot melt bead, 2.0 g/linear meter (g/lm) and the oven temperature is increased automatically rather than manually.

Shear Adhesion Failure Temperature ("SAFT") Test Method

The shear adhesion failure temperature ("SAFT") is the temperature in degrees Celsius at which the bond of the sample fails. SAFT is measured in accordance with the SAFT test in ASTM D-4498 with the exception that the thickness of the test piece sandwich is a hot melt bead, 2.0 g/lm and the oven temperature is increased automatically rather than manually.

Set Time

Set time test is the amount of dwell time necessary to obtain 100% fiber tear between 2 substrates. A bead of glue, 2.0 g/lm is applied to a corrugated substrate (5 cm$^2$) at 110° C. A second substrate (same size and type) is pushed into place after 2 sec and pressed for varying times.

The setting time is the time needed to obtain 100% fiber tears when the substrates are separated.

Adhesion—Mead Method

Fiber tear measures the percentage of fiber that covers the area of the adhesive after two substrates, which have been previously bonded together through the adhesive, are separated by force. The percentage of fiber tear is determined as follows.

A bead of hot melt, 2.0+/−0.1 grams/lm is applied at 105° C. using a hot melt applicator system from ITW DYNATEC. The adhesive is applied to one substrate and then a bond is made to the second substrate. The substrate is Kraft cardboard.

The bond is formed 1.0 seconds after the adhesive is applied.

Bonded substrates are stored in several temperature conditions (−18° C., +4° C., +23° C., +45° C.) for around 24 hours.

The parts are removed and manually pulled apart. 5 samples are tested at each temperature condition. Estimation of the percent fiber tear is done visually. The result is the average of the 5 bonds.

Pop Open Test Method

Bonds for the pop open test are made on an industrial case machine maker. The substrate is a flat corrugated 1 groove carton case, from Mondi.

The hot melt is applied at 107° C. with Nordson nozzle and a quantity of 0.7 grams per case.

To compare adhesion performance in same condition, the pressure time is 3.0 seconds. There are 12 beads of hot melt applied to each case. All cases are stored at room temperature for 24 hours and then placed in a climatic chamber for 12 hours.

After 12 hours, the number of flaps that have popped open only under the strain of the carton is counted. The hot melt passes the test if all flaps stay in place without popping open.

TABLE 1

| Examples | | | |
|---|---|---|---|
|  | Comparative 1 | Comparative 2 | Example 1 |
| Maleic anhydride grafted polymer? | No | Yes | No |
| ESCOREZ 5400 | 34 weight % | 50.75 weight % | 24 weight % |
| DERTOLINE PLS |  |  | 26.5 weight % |
| WINGTACK EXTRA | 16.75 weight % |  |  |

NOTE:
Comparative 1, Comparative 2 and Example 1 contain the same amount and type of homogeneous linear or substantially linear ethylene interpolymer having a Brookfield viscosity of no greater than about 10000 cps at 177° C. and the same wax blend (paraffin/Fischer-tropsch); in Comparative 2, half of the polymer was replaced by a similar grade that was grafted with maleic anhydride.

TABLE 2

| Physical Properties of Examples | | | |
|---|---|---|---|
|  | Comparative 1 | Comparative 2 | Example 1 |
| Initial Viscosity 100° C. (cps) | 1650 |  | 1600 |
| Initial Viscosity 110° C. (cps) | 1100 |  | 1100 |
| Initial Viscosity 120° C. (cps) | 800 |  | 800 |
| Initial Viscosity 150° C. (cps) |  | 400 |  |
| Setting time at 110° C. (sec) | 1-2 | 2-3 | 1 |
| Adhesion Mead (−18/4/23/45° C.) | 90/95/95/90 | 95/90/90/95 | 80/95/90/95 |
| PAFT (° C.) | 40.5 | 48.9 | 44.4 |
| SAFT (° C.) | 61.2 | 61.3 | 60.6 |

NOTE:
The inclusion of the maleic anhydride grafted polymer increased the PAFT but negatively impacted set time at 110° C.

TABLE 3

Pop Open Test (HMA applied at 107° C., held at temperature for 24 hours, recorded number popped open on 12 flaps)

|  | Exposure Temperature | |
|---|---|---|
|  | 40° C. Flaps | 45° C. Flaps |
| Comparative 1 | 12 | 12 |
| Example 1 | 0 | 0 |

All patents and patent applications cited in this document are incorporates reference.

Other embodiments are within the claims.

What is claimed is:

1. A hot melt adhesive composition comprising:
   a. from 10% to 30% by weight a homogeneous linear or substantially linear ethylene interpolymer having a Brookfield viscosity of no greater than about 10,000 cps at 177° C.,
   b. from greater than about 10% by weight to about 30% by weight of a rosin-ester based tackifying agent,
   c. from about 10% by weight to about 40% by weight of a hydrocarbon tackifying agent,
   d. from 10% to 35% by weight a paraffin wax, and
   e. from 5% to 15% by weight a Fischer Tropsch wax, wherein the hot melt adhesive composition has a Brookfield viscosity of no greater than about 1400 cps at 120° C., and wherein the hot melt adhesive composition exhibits a fiber tearing bond at 23° C. when tested according to the Adhesion-Mead Method test.

2. The hot melt adhesive composition of claim 1 wherein the hot melt adhesive composition has a Brookfield viscosity of no greater than about 1000 cps at 120° C.

3. The hot melt adhesive composition of claim 1 wherein the Fischer-Tropsch wax has a congealing point of from about 65° C. to about 95° C.

4. The hot melt adhesive composition of claim 1 wherein the rosin-ester based tackifying agent and the hydrocarbon tackifying agent both have a softening point of from about 75° C. to about 110° C.

5. The hot melt adhesive composition of claim 1 wherein the rosin-ester based tackifying agent and the hydrocarbon tackifying agent both have a softening point of from about 95° C. to about 105° C.

6. The hot melt adhesive composition of claim 1 comprising: from about 15% by weight to about 30% by weight of the rosin-ester based tackifying agent and from about 15% by weight to about 30% by weight of the hydrocarbon tackifying agent.

7. The hot melt adhesive composition of claim 1 wherein said composition is free of maleic anhydride modified components.

8. The hot melt adhesive composition of claim 1 wherein the homogeneous linear or substantially linear ethylene interpolymer is selected from the group consisting of ethylene octene copolymer, ethylene hexene copolymer, ethylene butene copolymer, and ethylene propylene copolymer.

9. The hot melt adhesive composition of claim 1 wherein the homogeneous linear or substantially linear ethylene interpolymer is made with a single site catalyst.

10. The hot melt adhesive composition of claim 1 further comprising a vinyl polymer.

11. The hot melt adhesive composition of claim 1 further comprising an aromatic tackifying agent.

12. The composition of claim 1 further comprising a propylene based polymer.

13. A method of making or closing an article, the method comprising:
  a. heating the hot melt adhesive composition of claim 1; and
  b. applying the hot melt adhesive composition on a substrate at an application temperature of no greater than 121° C.

14. The method of claim 13 wherein the hot melt adhesive composition is applied at a temperature of no greater than 115° C.

15. The method of claim 13 wherein the hot melt adhesive composition is applied at a temperature of no greater than 110° C.

16. The method of claim 13 wherein the article comprises a cellulose based substrate.

* * * * *